United States Patent
Chou et al.

(10) Patent No.: US 11,609,140 B2
(45) Date of Patent: Mar. 21, 2023

(54) DISPLAY STRUCTURE OF PRESSURE GAUGE OF AIR COMPRESSOR

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

(*) Notice: Subject to any disclaimer, the term of this patent is extended or adjusted under 35 U.S.C. 154(b) by 252 days.

(21) Appl. No.: 17/114,105

(22) Filed: Dec. 7, 2020

(65) Prior Publication Data
US 2021/0190623 A1 Jun. 24, 2021

(30) Foreign Application Priority Data
Dec. 19, 2019 (TW) ................................. 108146790

(51) Int. Cl.
*G01L 19/16* (2006.01)
*G01L 7/16* (2006.01)
(Continued)

(52) U.S. Cl.
CPC .............. *G01L 19/16* (2013.01); *F04B 51/00* (2013.01); *G01D 7/002* (2013.01); *G01D 11/26* (2013.01); *G01L 7/043* (2013.01); *G01L 7/166* (2013.01); *G01L 19/10* (2013.01); *G01L 19/14* (2013.01); *F04B 39/00* (2013.01); *F04B 39/121* (2013.01); *F04B 2205/04* (2013.01); *G01L 27/005* (2013.01)

(58) Field of Classification Search
CPC ......... G01L 19/16; G01L 7/043; G01L 7/166; G01L 19/10; G01L 19/14; G01L 27/005; F04B 51/00; F04B 39/00; F04B 39/121; F04B 2205/04; G01D 7/002; G01D 11/26
See application file for complete search history.

(56) References Cited

U.S. PATENT DOCUMENTS 4,777,828 A * 10/1988 Ferris ...................... G01L 17/00
116/272
5,992,239 A * 11/1999 Boehringer ............. G01L 7/166
73/715
(Continued)

FOREIGN PATENT DOCUMENTS

CN 1107964 9/1995
CN 103196427 7/2013
(Continued)

OTHER PUBLICATIONS

"Office Action of China Counterpart Application", dated Aug. 24, 2022, p. 1-p. 6.

*Primary Examiner* — Ryan D Walsh
(74) *Attorney, Agent, or Firm* — JCIPRNET

(57) ABSTRACT

A display structure of a pressure gauge of an air compressor, the air compressor is received in an accommodation box, and a scale portion of the pressure gauge is viewable via a displaying opening of the accommodation box, the pressure gauge includes a cylindrical body which is transparent and is formed in a pen shape, and the pressure gauge includes a colored O-ring configured to indicate a pressure value of the scale portion. The scale portion is not printed on the cylindrical body of the pressure gauge and includes a transparent panel on which the pressure value of the scale portion is marked on an internal face of the transparent panel, and the internal face faces the cylindrical body of the pressure gauge.

4 Claims, 10 Drawing Sheets

(51) Int. Cl.
*G01D 7/00* (2006.01)
*G01L 7/04* (2006.01)
*F04B 51/00* (2006.01)
*G01L 19/10* (2006.01)
*G01D 11/26* (2006.01)
*G01L 19/14* (2006.01)
*G01L 27/00* (2006.01)
*F04B 39/12* (2006.01)
*F04B 39/00* (2006.01)

(56) References Cited

U.S. PATENT DOCUMENTS

| | | | | |
|---|---|---|---|---|
| 2014/0216164 A1* | 8/2014 | Chou | ............... | G01L 7/163 |
| | | | | 73/732 |
| 2015/0337825 A1* | 11/2015 | Chou | ............... | F04B 37/18 |
| | | | | 417/415 |
| 2016/0076534 A1* | 3/2016 | Chou | ............... | F04B 33/005 |
| | | | | 73/168 |
| 2016/0076957 A1* | 3/2016 | Chou | ............... | F16K 37/00 |
| | | | | 73/744 |
| 2016/0097383 A1* | 4/2016 | Chou | ............... | F04B 39/10 |
| | | | | 417/63 |

FOREIGN PATENT DOCUMENTS

| | | | |
|---|---|---|---|
| CN | 105424265 | 3/2016 | |
| DE | 4331720 A1 * | 3/1995 | ........... B01D 37/046 |
| TW | M524460 | 6/2016 | |

* cited by examiner

DISPLAY STRUCTURE OF PRESSURE GAUGE OF AIR COMPRESSOR

FIELD OF THE INVENTION

The present invention relates to a display structure of a pressure gauge of an air compressor which contains the scale portion not touched by a user and stained.

BACKGROUND OF THE INVENTION

A conventional pressure gauge moves back and forth like a piston so as to display a pressure value, wherein a display screen is arranged on the pressure gauge and includes a scale portion formed on an outer wall of a cylindrical body. Accordingly, the pressure value cannot be viewable exactly because of the cylindrical body to cause a sight difference and a reading error of the pressure gauge.

The present invention has arisen to mitigate and/or obviate the afore-described disadvantages.

SUMMARY OF THE INVENTION

The primary aspect of the present invention is to provide a display structure of a pressure gauge of an air compressor which contains the transparent panel including the internal face and the external face, and the pressure value of the scale portion being marked on the internal face of the transparent panel facing the pressure gauge, hence the scale portion is not touched by the user and is not stained.

Another aspect of the present invention is to provide a display structure of a pressure gauge of an air compressor which contains the at least one first calibration unit and the at least one second calibration unit to be adjustable by the user so that the pressure value of the pressure gauge is viewable exactly.

DETAILED DESCRIPTION OF THE PREFERRED EMBODIMENTS

Figure 1:
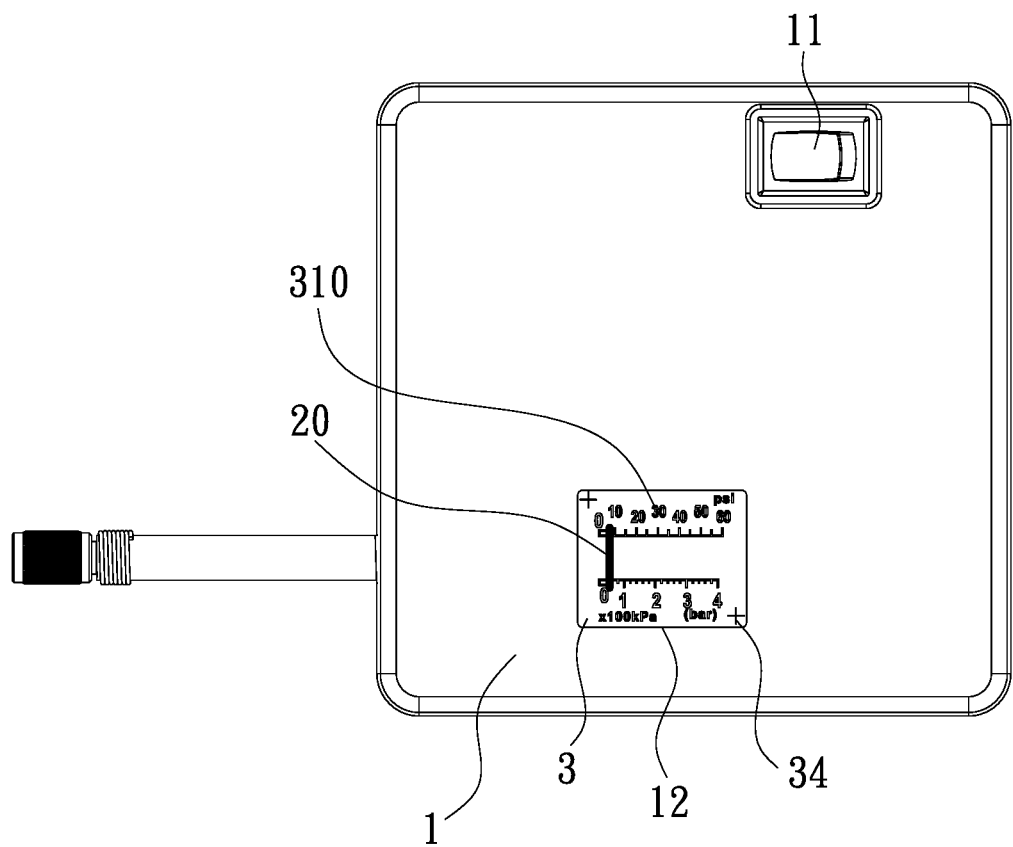
FIG. 1 is a top plan view showing the application of a display structure of a pressure gauge of an air compressor according to a first embodiment of the present invention.
Figure 2:
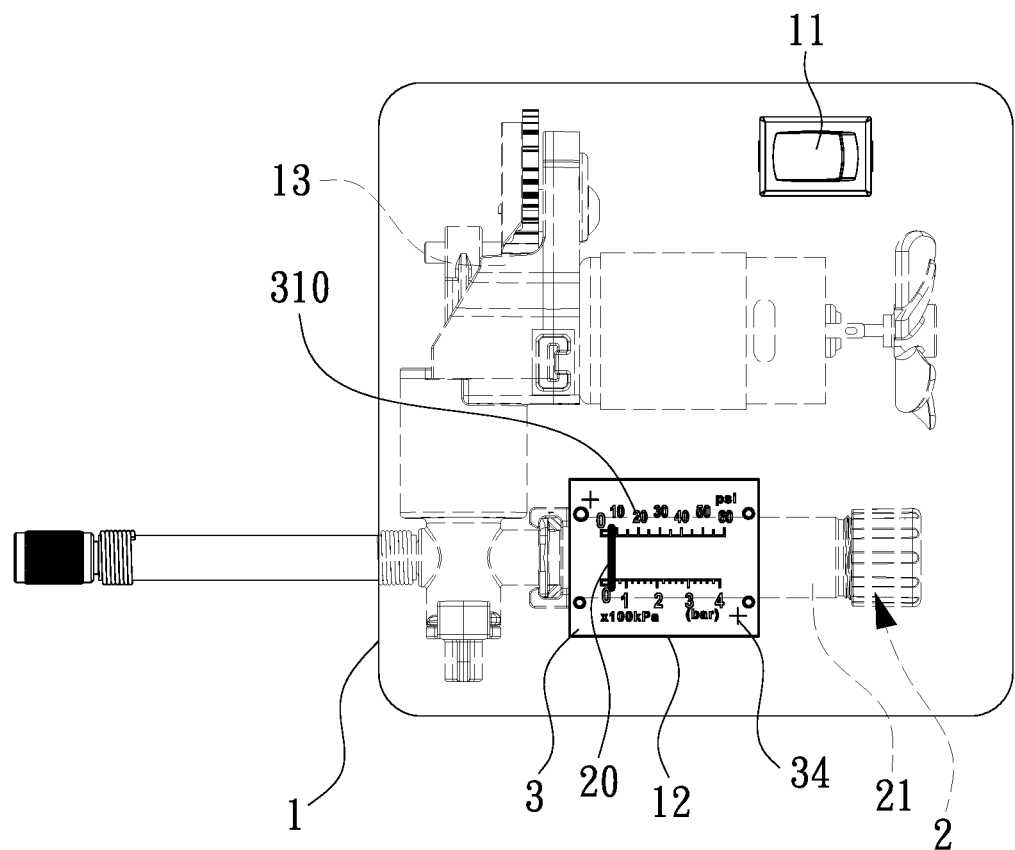
FIG. 2 is a bottom plan view showing the air compressor being received in the accommodation box according to the first embodiment of the present invention.
Figure 3:
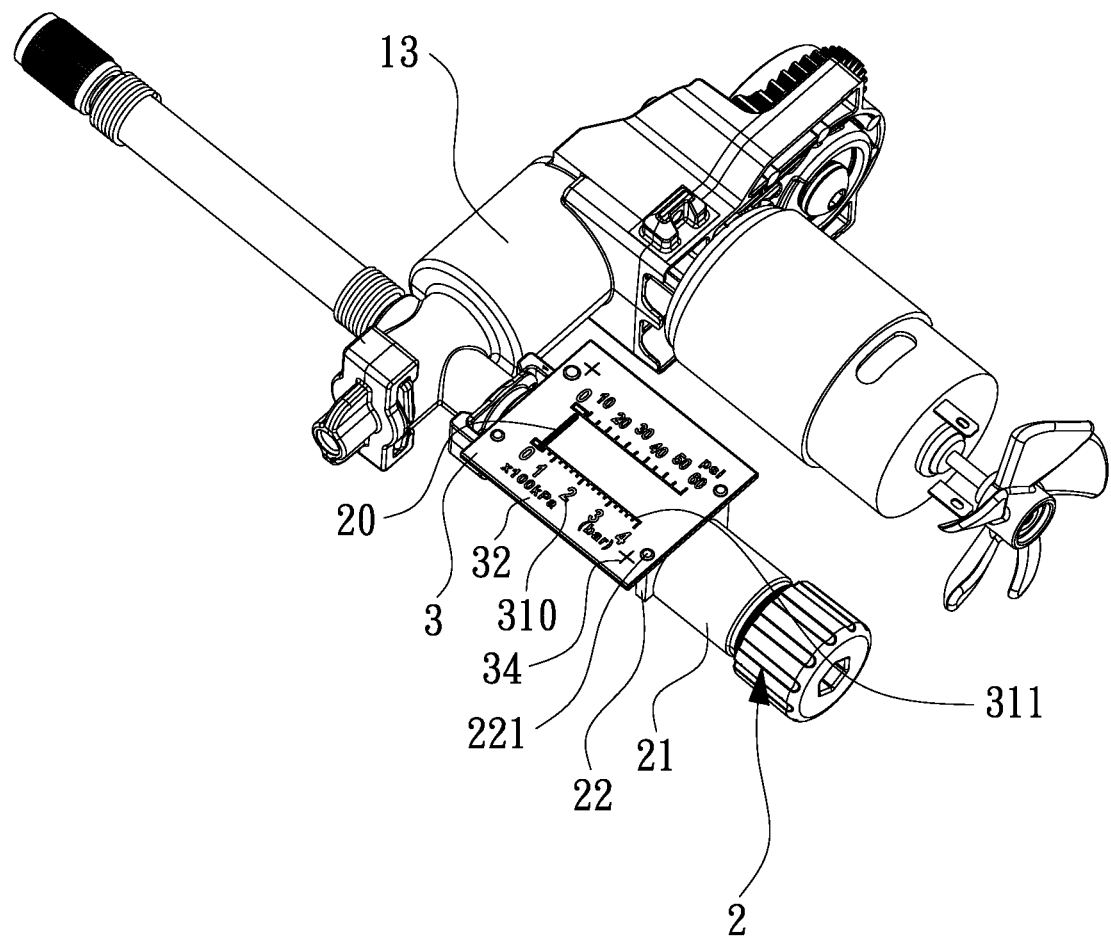
FIG. 3 is a perspective view showing the pressure gauge being connected with the air compressor according to the first embodiment of the present invention.

With reference to FIGS. 1-3, a display structure of a pressure gauge of an air compressor 13 according to a first embodiment of the present invention, the air compressor 13 is received in an accommodation box 1, and the accommodation box 1 includes a switch 11 and a hollow displaying opening 12, the air compressor 13 is connected with the pressure gauge 2, and a scale portion 310 of the pressure gauge 2 is viewable via the displaying opening 12.

Figure 6:
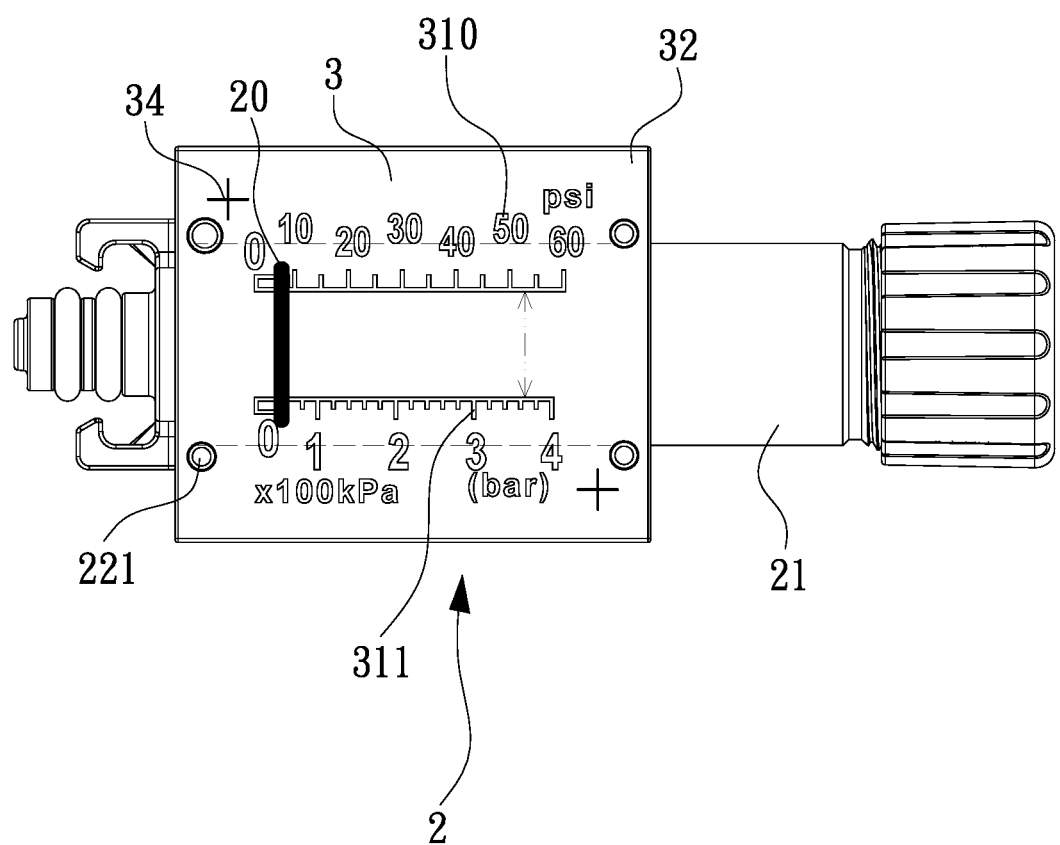
FIG. 6 is a top plan view showing the assembly of the pressure gauge according to the first embodiment of the present invention.
Figure 7:
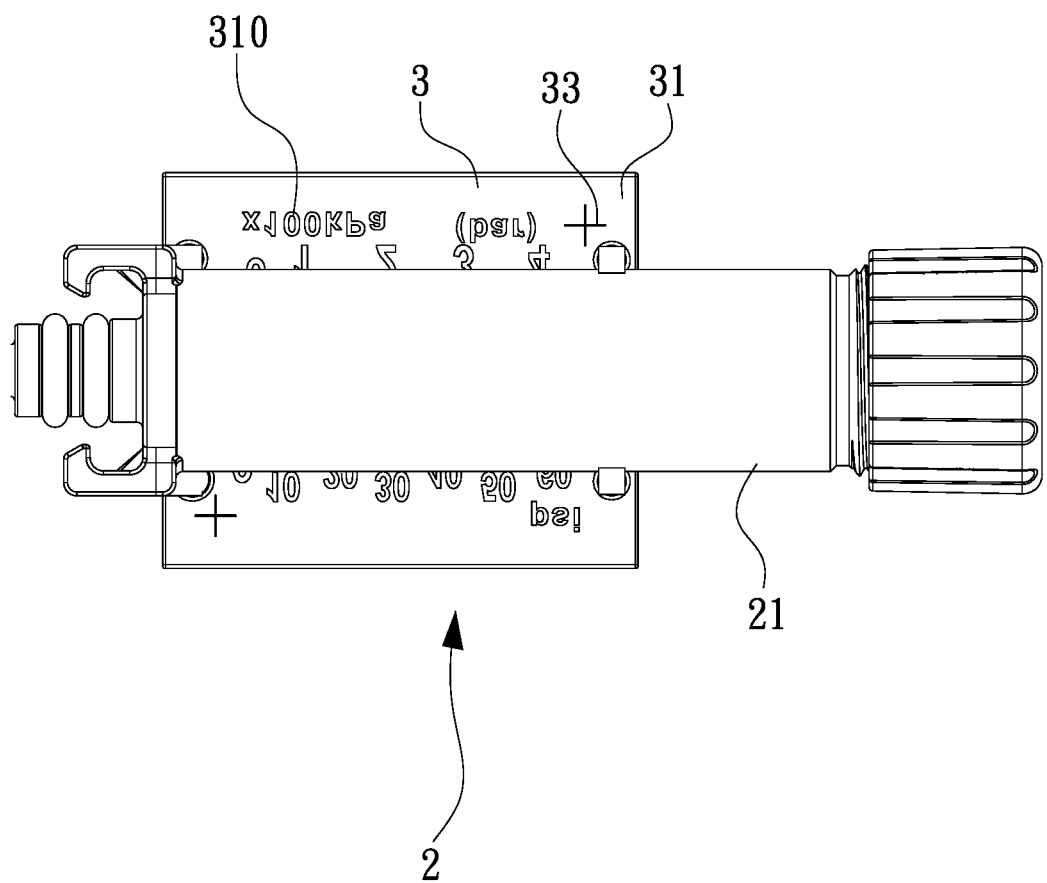
FIG. 7 is a bottom plan view showing the assembly of the pressure gauge according to the first embodiment of the present invention.

The pressure gauge 2 moves back and forth like a piston to display a pressure value, the pressure gauge 2 includes a cylindrical body 21 which is transparent and is formed in a pen shape, and the pressure gauge 2 includes a colored O-ring 20 configured to indicate the pressure value of the scale portion 310, as shown in FIGS. 3 and 6.

Figure 4:
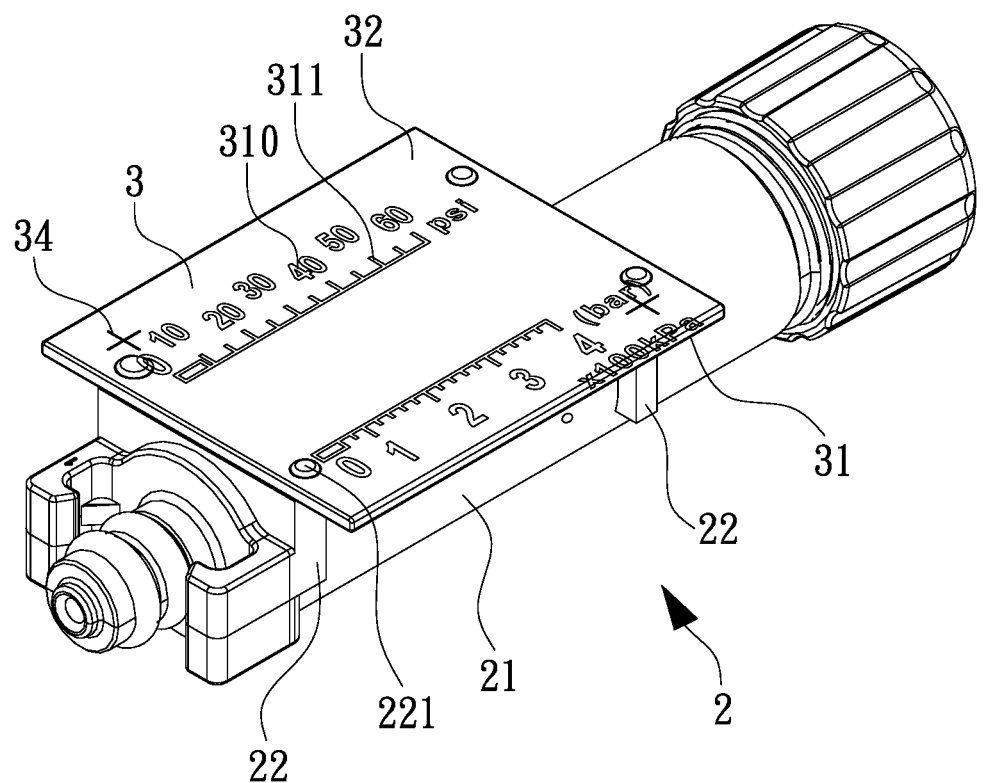
FIG. 4 is a perspective view showing the assembly of the pressure gauge according to the first embodiment of the present invention.

The scale portion 310 is not printed on the cylindrical body 21 of the pressure gauge 2 and includes a transparent panel 3 on which the pressure value of the scale portion 310 is marked on an internal face 31 of the transparent panel 3, and the internal face 31 faces the cylindrical body 21 of the pressure gauge 2 so that the transparent panel 3 is not touched by a user or is stained by external environment (such as dusts). The transparent panel 3 of the scale portion 310 is detachably connected with the cylindrical body 21 of the pressure gauge 2, and the cylindrical body 21 has at least one fixing rack 22 on which at least one positioning bolt 221 is arranged, such that the at least one positioning bolt 221 of the at least one fixing rack 22 of the cylindrical body 21 is connected with at least one connection orifice 30 of the transparent panel 3, as illustrated in FIGS. 4 and 5.

At least one scale line 311 of the scale portion 310 is thicken or lengthen, as shown in FIG. 6, such that the pressure value of the pressure gauge 2 is viewable clearly by the user after the colored O-ring of the pressure gauge 2 is forced to move.

Figure 5:
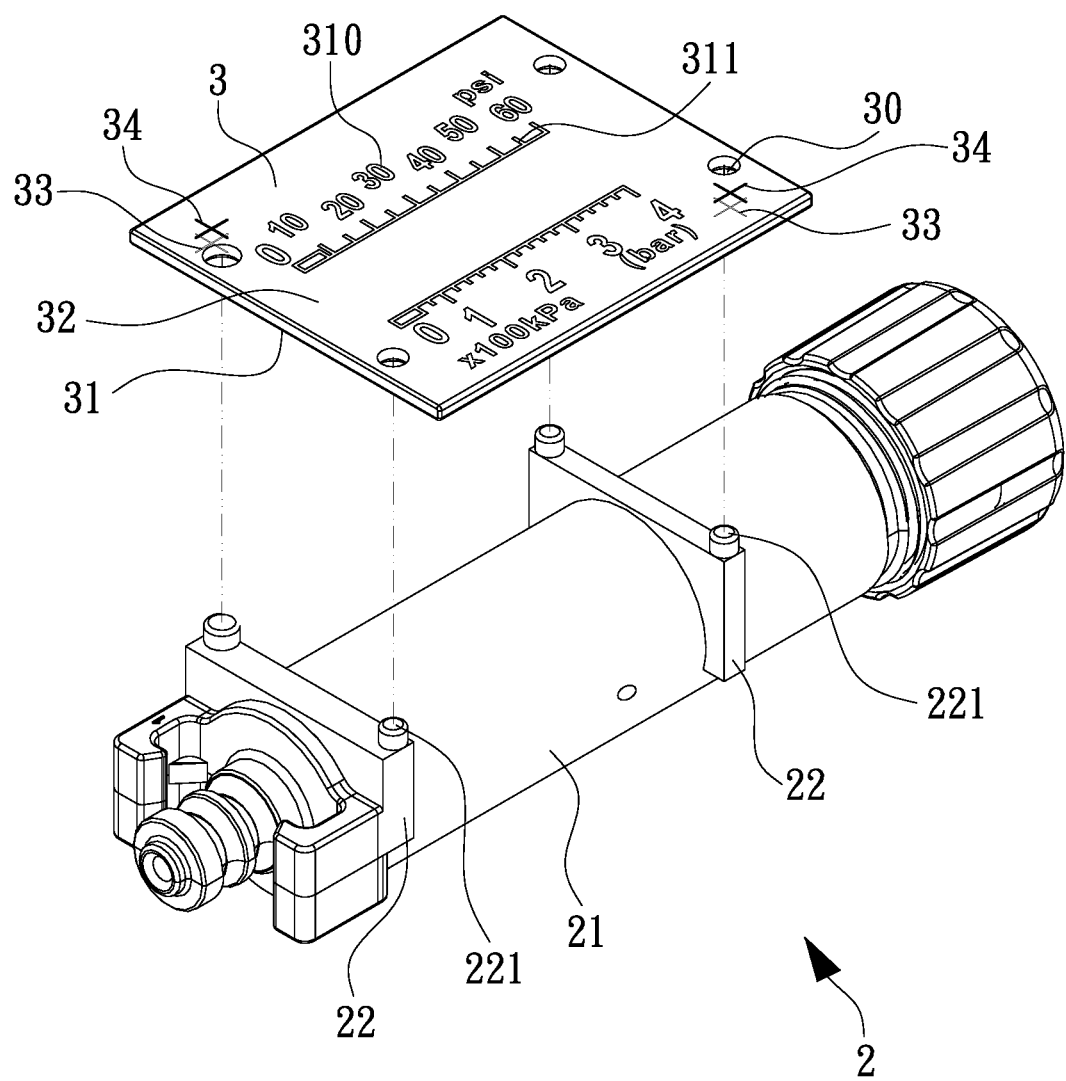
FIG. 5 is a perspective view showing the exploded components of the display structure of the pressure gauge of the air compressor according to the first embodiment of the present invention.

Referring to FIG. 5, the transparent panel 3 further includes at least one first calibration unit 33, wherein a respective the first calibration unit 33 is defined by a circular hole cross or other patterns, and the transparent panel 3 includes at least one second calibration unit 34, wherein a respective the second calibration unit 34 is defined by a cross or other patterns, and the at least one first calibration unit 33 and the at least one second calibration unit 34 are configured to be adjustable by the user and are printed on the internal face 31 and an external face 32 of the transparent panel 3, such that a height difference and an oblique viewing angle are formed between the internal face 31 and the external face 32 so that a viewing sight is perpendicular to the scale portion 310, and the pressure value is viewable accurately via the internal face 31 and the external face 32 of the transparent panel 3.

Operational warning texts or a logo is printed on the external face 32 or the internal face 31 of the transparent panel 3.

Figure 8:
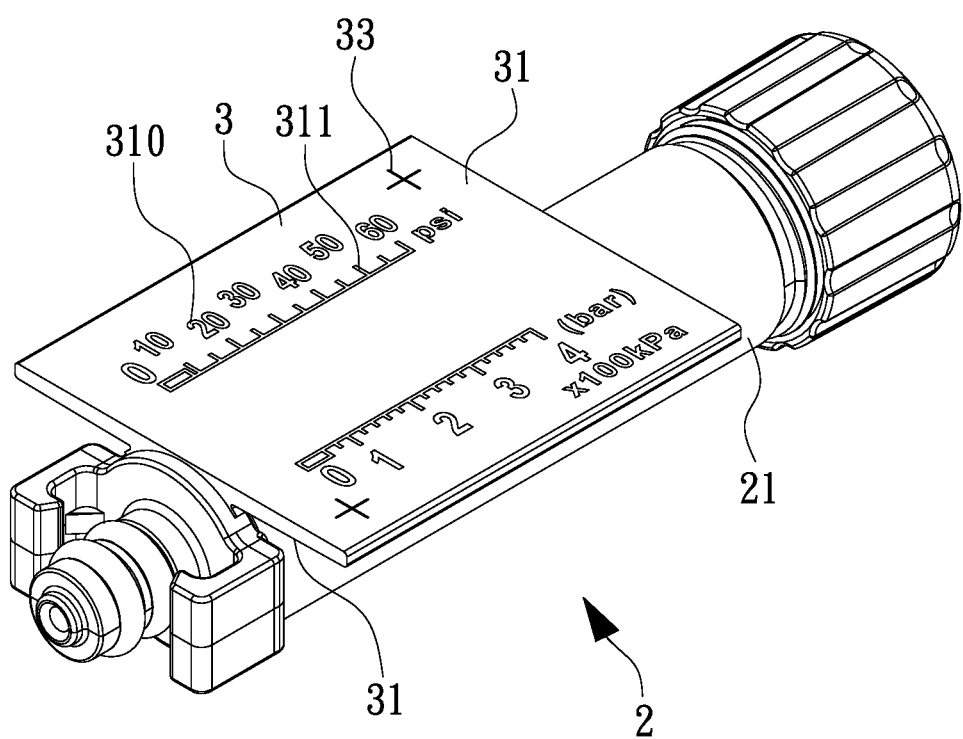
FIG. 8 is a perspective view showing the assembly of a pressure gauge according to a second embodiment of the present invention.
Figure 9:
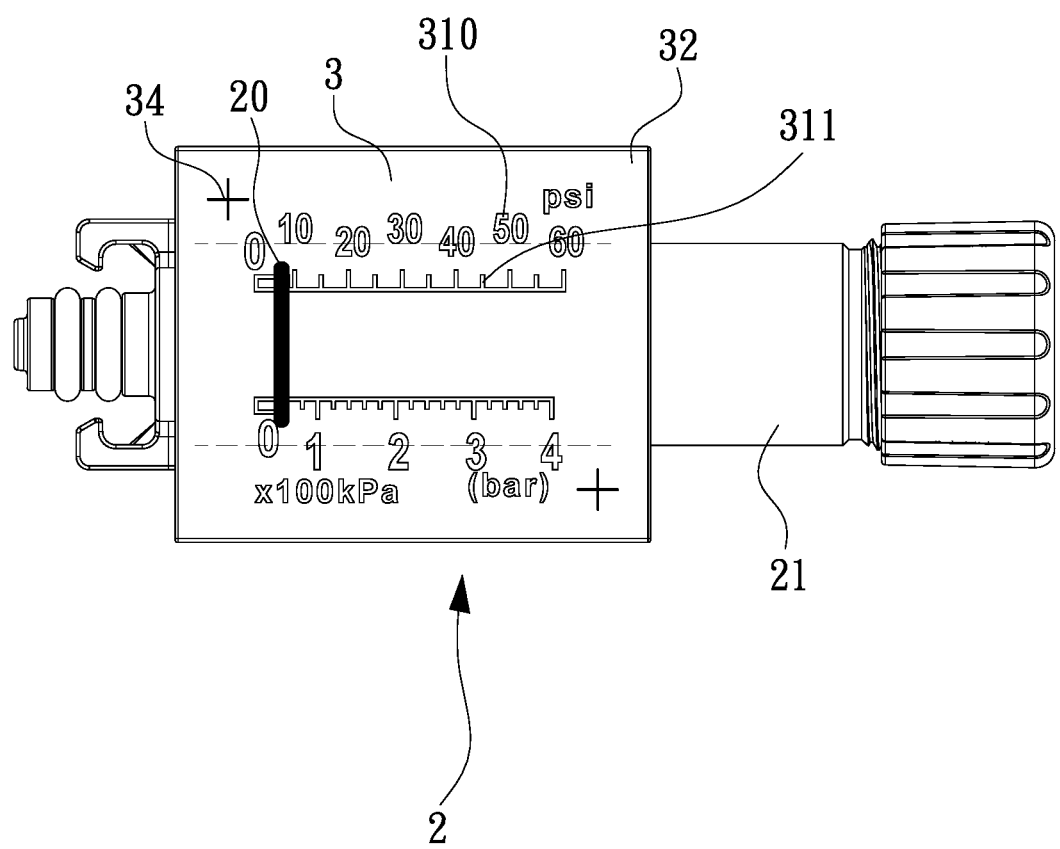
FIG. 9 is a top plan view showing the assembly of the pressure gauge according to the second embodiment of the present invention.
Figure 10:
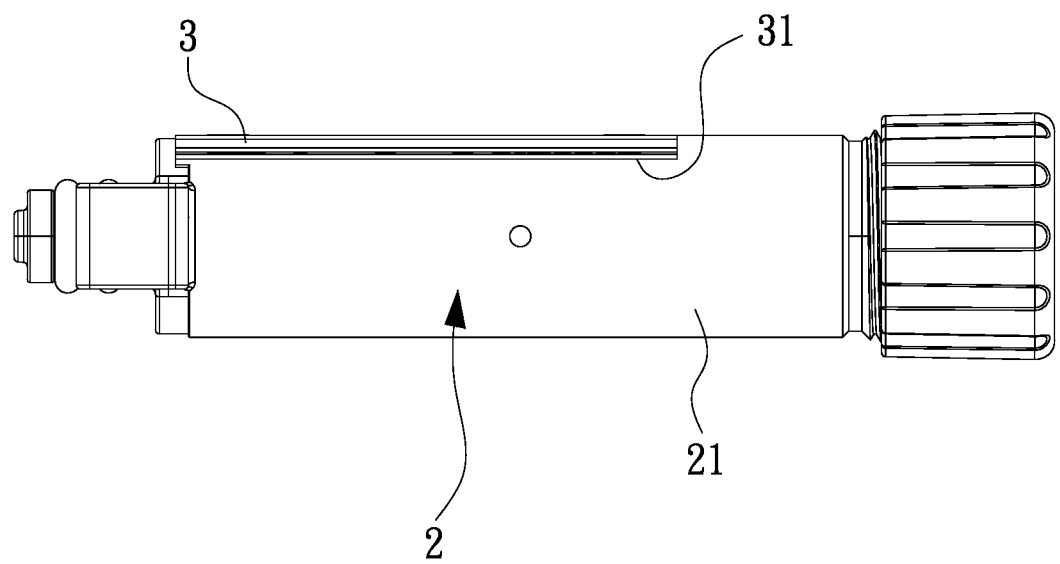
FIG. 10 is a side plan view showing the assembly of the pressure gauge according to the second embodiment of the present invention.

As illustrated FIGS. 8-10, in a second embodiment, an internal face 31 of the transparent panel 3 has a scale portion 310 and is one-piece formed with a cylindrical body 21 so as to form a pressure gauge 2.

Accordingly, the display structure of the pressure gauge 2 of the air compressor 13 comprises the transparent panel 3 which includes the internal face and the external face, and the operational warning texts or the logo is printed on the external face or the internal face of the transparent panel so that the pressure value of the scale portion 310 is marked on the internal face 31 of the transparent panel 3 facing the pressure gauge 2, hence the scale portion 310 is not touched by the user and is not stained. Preferably, the transparent panel 3 is one-piece formed or is detachably connected with the cylindrical body 21 of the pressure gauge 2. The transparent panel 3 further includes the at least one first calibration unit 33 and the at least one second calibration unit 34 which are adjustable by the user so that the pressure value of the pressure gauge 2 is viewable exactly.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A display structure of a pressure gauge of an air compressor, the air compressor being received in an accommodation box, and a scale portion of the pressure gauge being viewable via a displaying opening of the accommodation box the pressure gauge including a cylindrical body which is transparent and is formed in a pen shape, and the pressure gauge including a colored O-ring configured to indicate a pressure value of the scale portion;

wherein the scale portion is not printed on the cylindrical body of the pressure gauge and includes a transparent panel on which the pressure value of the scale portion is marked on an internal face of the transparent panel, and the internal face faces the cylindrical body of the pressure gauge, wherein the transparent panel includes at least one first calibration unit and at least one second calibration unit, the at least one first calibration unit is defined by a cross, the second calibration unit is defined by a cross, the at least one first calibration unit and the at least one second calibration unit are printed on the internal face and the external face of the transparent panel respectively, such that a height difference and an oblique viewing angle are formed between the internal face and the external face so that a viewing sight is perpendicular to the scale portion, and the pressure value is viewable accurately via the internal face and the external face of the transparent panel, wherein the transparent panel of the scale portion is detachably connected with the cylindrical body of the pressure gauge, and the cylindrical body has at least one fixing rack on which at least one positioning bolt is arranged, such that the at least one positioning bolt of the at least one fixing rack of the cylindrical body is connected with at least one connection orifice of the transparent panel.

2. The display structure of a pressure gauge as claimed in claim 1, wherein operational warning texts or a logo is printed on an external face or the internal face of the transparent panel.

3. The display structure of a pressure gauge as claimed in claim 1, wherein the internal face of the transparent panel has the scale portion and is one-piece formed with the cylindrical body.

4. The display structure of a pressure gauge as claimed in claim 1, wherein at least one scale line of the scale portion is thicken or lengthen, such that the pressure value of the pressure gauge is viewable clearly by a user after the colored O-ring of the pressure gauge is forced to move.

\* \* \* \* \*